July 2, 1935. G. P. BOSOMWORTH 2,007,118
TEMPERATURE INDICATING DEVICE
Filed Dec. 8, 1933
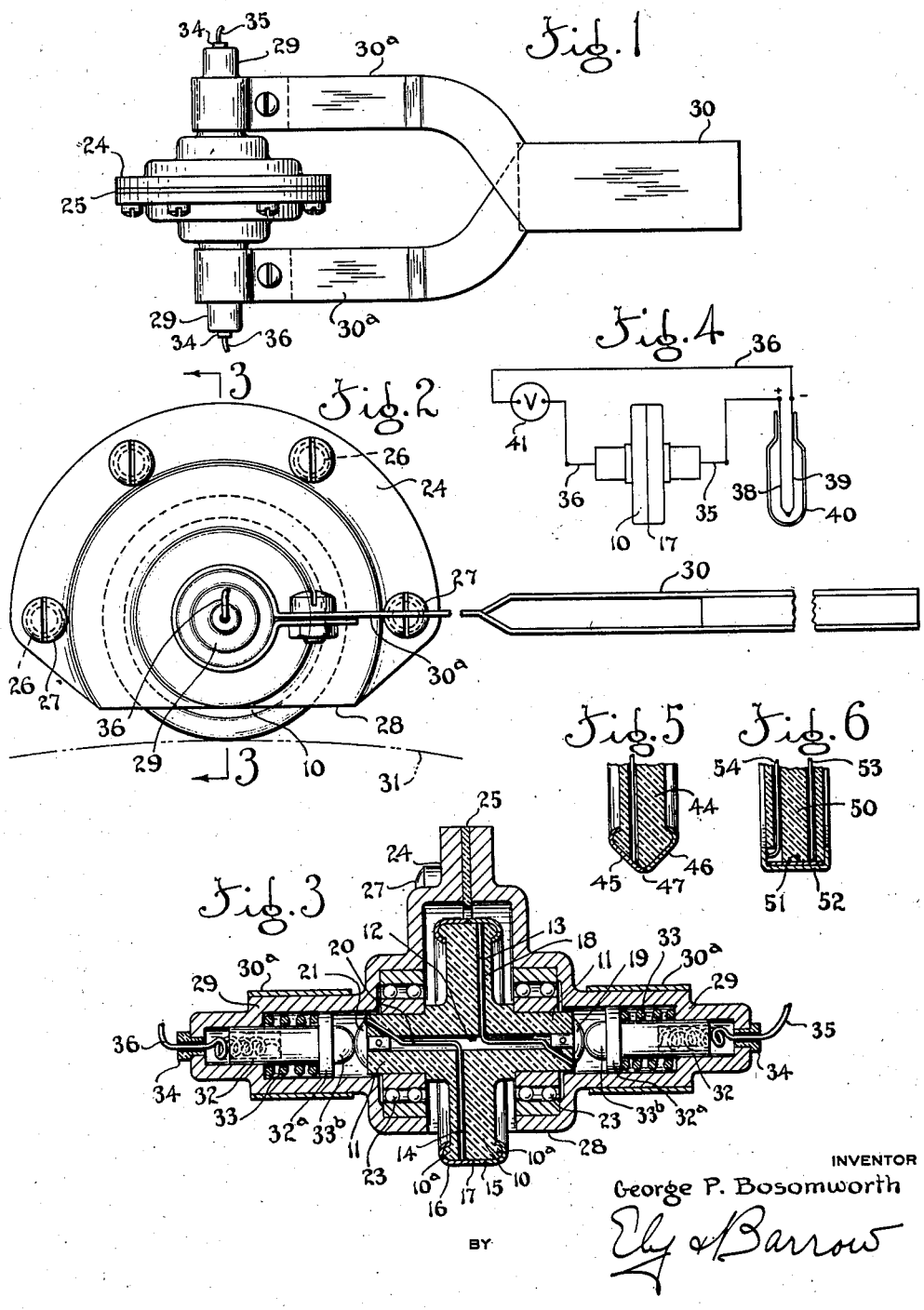
INVENTOR
George P. Bosomworth
BY Ely & Barrow
ATTORNEYS Patented July 2, 1935

2,007,118

UNITED STATES PATENT OFFICE 2,007,118

TEMPERATURE INDICATING DEVICE

George P. Bosomworth, Akron, Ohio, assignor to The Firestone Tire & Rubber Company, Akron, Ohio, a corporation of Ohio Application December 8, 1933, Serial No. 701,479

6 Claims. (Cl. 136—4)

This invention relates to temperature indicating devices, and more especially to devices for indicating the temperature of moving bodies, such as moving sheet material, mill rolls, and the like.

The chief object of the invention is to obtain greater accuracy in the measuring of temperature of moving bodies. More specifically the invention aims to avoid errors due to heat friction such as is present in temperature indicating devices that slide upon a moving body; to avoid errors due to heat radiation; and to obviate wear of the work-contacting member. Other objects will be manifest.

Briefly stated, the invention comprises a thermocouple, and an instrument responsive to the electric current generated therein, said thermocouple having its hot junction arranged for rotary movement so that it may engage a moving body with the minimum of friction, and the electrically responsive instrument having its dial calibrated in terms of heat corresponding to the voltage passing therethrough.

Of the accompanying drawing:

Figure 1 is a plan view of a thermocouple embodying the invention, in its preferred form;

Figure 2 is a side elevation thereof, on a larger scale;

Figure 3 is a section on the line 3—3 of Figure 2;

Figure 4 is a conventional wiring diagram of the invention;

Figure 5 is a modified form of the hot junction of the thermocouple; and

Figure 6 is another modified form of the said hot junction.

Referring to the drawing, especially Figure 3 thereof, 10 is a rotor consisting of a central disc or wheel that is formed on opposite sides with respective axially arranged trunnions 11, 11, said rotor being composed of dielectric material, such as the molded composition of mica known to trade as "micarta". The rotor 10 is formed with an axial bore 12, and with oppositely-extending radial bores 13, 14 extending from the axial bore 12 to the perimeter of the rotor, said bores 13, 14 being on opposite sides of the medial plane of the disc portion of the rotor. Encircling the perimeter of the rotor disc is a bimetal facing consisting of two metal strips 15, 16 united in edge to edge relation by solder, welding or other suitable means as at 17. Preferably one of the metal strips 15 is of copper and the other strip 16 is constantan (a nickel alloy) although other metals commonly used for thermocouples may be used. The juncture 17 of the two metal strips is disposed in the central plane of the disc, and the lateral marginal portions of the composite strip may be crimped about the edges of the disc, the latter preferably being provided with marginal flanges 10a, 10a for engagement by the said strip. Connected to copper strip 15 is a conductor wire 18 that extends through radial bore 13 and axial bore 12 to a terminal 19 on the end face of one of the trunnions 11, said terminal consisting of a round-head stud or pin having its shank portion secured in bore 12. In like manner a conductor wire 20 is connected to constantan strip 16 and extends through bores 14 and 12 to a terminal 21 on the end face of the other trunnion 11.

The trunnions 11 of rotor 10 are mounted in respective bearings 23, 23 that are mounted in a metal housing 24, the latter being constructed of two identical halves that are insulated from each other by means of an intervening gasket 25 of dielectric material and insulating bushings 26, 26, Figure 2, about the screws 27 that hold said housing parts in assembled relation. The housing 24 is cut away at 28 to expose the rotor therein. The housing 24 is formed on its opposite sides with hollow axial extensions 29, 29, and engaging said extensions are respective arms 30a, 30a constituting the forked end portion of a supporting arm 30. The latter may be made of thin resilient metal such as phosphor bronze, and is adapted yieldingly to support the housing 24 and rotor 10 upon a movable body, such as the mill roll 31, Figure 2.

Slidably mounted within the hollow housing extensions 29 are respective plungers 32, 32. Each of said plungers is formed with a flange 32a, and a compression spring 33 is mounted upon the plunger and engages said flange to urge said plunger toward the terminal 19 or 21 on the adjacent end of rotor 10. The plunger 32 also is formed with a rounded contact head 33b that engages said terminal, the arrangement being such that there is electrical connection through the terminal and contact head 33b, but friction therebetween is so small that rotation of the rotor 10 and terminal does not impart similar movement to the plunger. Connected to each plunger 32 is an electrical conductor wire that extends through a bushing 34 of insulating material mounted in the end wall of housing extension 29. The wire that has communication through the plunger with terminal 19 is designated 35. The conductor connecting with terminal 21 is designated 36.

The peripheral metal sheath on the rotor 10 constitutes the hot junction of a thermocouple, which junction is movable relatively of the work so as progressively and continuously to contact with the same. The remainder of the thermocouple is shown diagrammatically in Figure 4 wherein the cold junction thereof is shown as a copper plate 38 and a constantan plate 39 joined together at one end and immersed in a vacuum flask 40 containing melting ice. The conductor 35 from the hot junction is connected to plate 38, and the conductor 36 is connected to the plate 39, there being a millivoltmeter 41 mounted across conductor 36 for measuring the induced electromotive force in the thermocouple. The latter may be calibrated in terms of temperature.

The device is relatively simple in construction and operation and achieves the other objects set out in the foregoing statement of objects.

In the modified construction shown in Figure 5, the rotor disc 44 has its periphery oppositely beveled as shown, said beveled portions being covered by respective metal plates 45 of constantan and 46 of copper. Said plates are joined along their adjacent lateral margins in a seam 47 that is disposed along the largest diameter of the rotor.

In the modified construction shown in Figure 6, the rotor 50 has a transversely flat peripheral surface that is covered by a circumferential band of copper 51 and a circumferential band of constantan 52, the latter being superposed upon the copper band 51 and having its lateral marginal portions folded over onto the lateral faces of the rotor to retain both metal bands in place. Conductor wires 53, 54 connected to respective metal bands 51, 52 extend through respective radial bores in the rotor as in the previously described embodiments of the invention.

Other modifications may be resorted to without departing from the spirit of the invention or the scope of the appended claims.

What is claimed is:

1. A temperature indicating device comprising a thermocouple having a hot junction constructed and arranged for rotary rolling movement.

2. A temperature indicating device comprising a thermocouple having a hot junction movable relatively of the work with rolling friction.

3. In a thermocouple, a rotor of dielectric material, a support in which said rotor is journaled, and juxtaposed metal plates on the perimeter of said rotor constituting the hot junction of the thermocouple.

4. In a temperature indicating device, the combination of a housing, a rotor of dielectric material journaled therein, juxtaposed metal plates on the perimeter of the rotor constituting the hot junction of a thermocouple, and means for yieldingly urging the rotor against a moving body.

5. In a thermocouple, a rotor of dielectric material, a support in which said rotor is journaled, juxtaposed metal plates on the perimeter of the rotor constituting a hot junction, conductor wires from the respective metal plates to respective axially arranged contact mebers, yieldingly mounted plungers, engaging said contact members, and electrical connections from said plungers to the cold junction of the thermocouple.

6. A temperature indicating device comprising a rotatable roller, and a thermocouple disposed circumferentially about the periphery of said roller.

GEORGE P. BOSOMWORTH.